United States Patent [19]

Inamori

[11] Patent Number: 5,961,570
[45] Date of Patent: Oct. 5, 1999

[54] DISPLAY UNIT FOR VEHICLE

[75] Inventor: Nobuya Inamori, Nagoya, Japan

[73] Assignees: Harness System Technologies Research, Ltd., Nagoya; Sumitomo Wiring Systems, Ltd., Mie; Sumitomo Electric Industries, Ltd., Osaka, all of Japan

[21] Appl. No.: 09/176,887

[22] Filed: Oct. 22, 1998

[30] Foreign Application Priority Data

Nov. 12, 1997 [JP] Japan .................................. 9-310307

[51] Int. Cl.⁶ .......................... G06F 165/00; G08G 1/123
[52] U.S. Cl. .......................... 701/200; 701/225; 340/988; 340/990; 340/995
[58] Field of Search .................................. 701/200, 216, 701/7, 225, 201–10; 345/156, 7, 173; 340/988, 990, 5

[56] References Cited

U.S. PATENT DOCUMENTS

| | | | |
|---|---|---|---|
| 4,862,374 | 8/1989 | Ziemann | 701/200 |
| 5,278,763 | 1/1994 | Agnew et al. | 701/200 |
| 5,559,511 | 9/1996 | Ito et al. | 701/207 |

*Primary Examiner*—William A. Cuchlinski, Jr.
*Assistant Examiner*—Yonel Beaulieu
*Attorney, Agent, or Firm*—Oliff & Berridge, PLC

[57] ABSTRACT

A car navigation system 11 has a screen change section 19*d* for changing one screen to a different screen based on a predetermined input signal, a display signal generation section 19*c* for generating a video signal for displaying the different screen, a liquid crystal display section 17 being responsive to the signal level of the video signal for changing voltage applied to liquid crystal of each pixel part in a predetermined change range and displaying the corresponding screen, ROM 31 for storing a plurality of the change ranges of the applied voltage preset in a one-to-one correspondence with the screens, and a brightness level control section 18 for selecting the change range corresponding to the different screen from among the change ranges stored in the ROM 31 and instructing the liquid crystal display section 17 to change the applied voltage in the selected change range.

4 Claims, 10 Drawing Sheets

DISPLAY UNIT FOR VEHICLE

BACKGROUND OF THE INVENTION

This invention relates to a car display unit and in particular to a car display unit for displaying a road map screen and various menu screens in car navigation.

Figure 14:
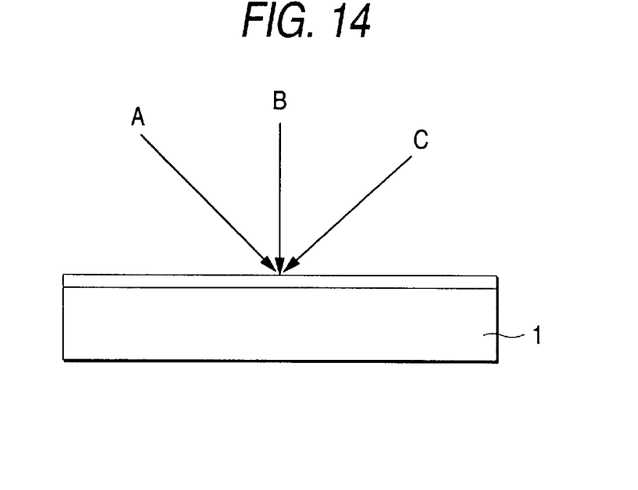
FIG. 14 is an illustration to show visible direction examples of a liquid crystal display.
Figure 15A:
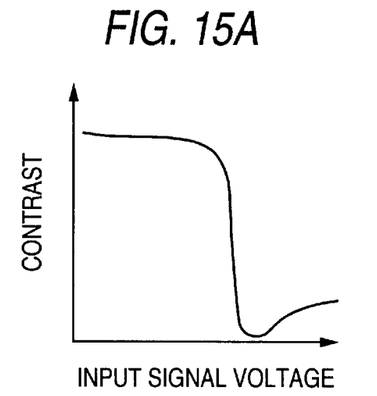
FIGS. 15A to 15C are illustrations to show the relationships between input signal value and contrast when a liquid crystal display screen is viewed from visible directions A, B, and C in FIG. 14.
Figure 15B:
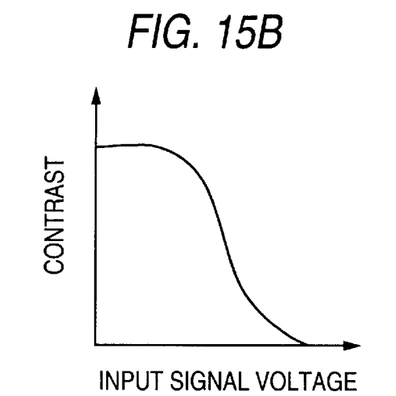
Figure 15C:
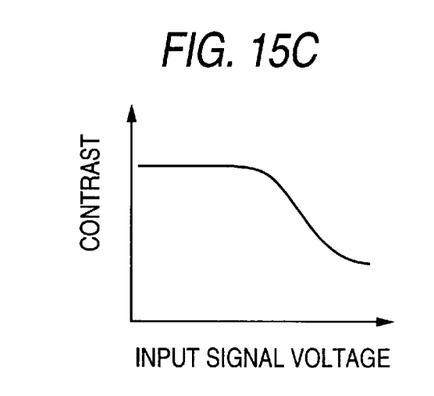

The technical background of the invention will be discussed. Generally, it is known that an image is inverted depending on the screen viewing angle with a car display unit. It is assumed that inversion of the image occurs as contrast changes with the viewing angle and that the contrast changes with the signal voltage (signal level) of a video signal (R, G, B signal) of an input signal to a liquid crystal display (LCD). The relationships between input signal voltage and contrast when a liquid crystal display 1 is viewed from direction A obliquely relative to the liquid crystal display 1, direction B directly above the liquid crystal display 1, and direction C obliquely relative to the liquid crystal display 1, for example, as shown in FIG. 14, become as shown in FIGS. 15A, 15B, and 15C. As seen in FIG. 15A, if a predetermined input signal voltage is exceeded, the contrast again rises and image inversion occurs in the direction A relative to the liquid crystal display 1.

Figure 16:
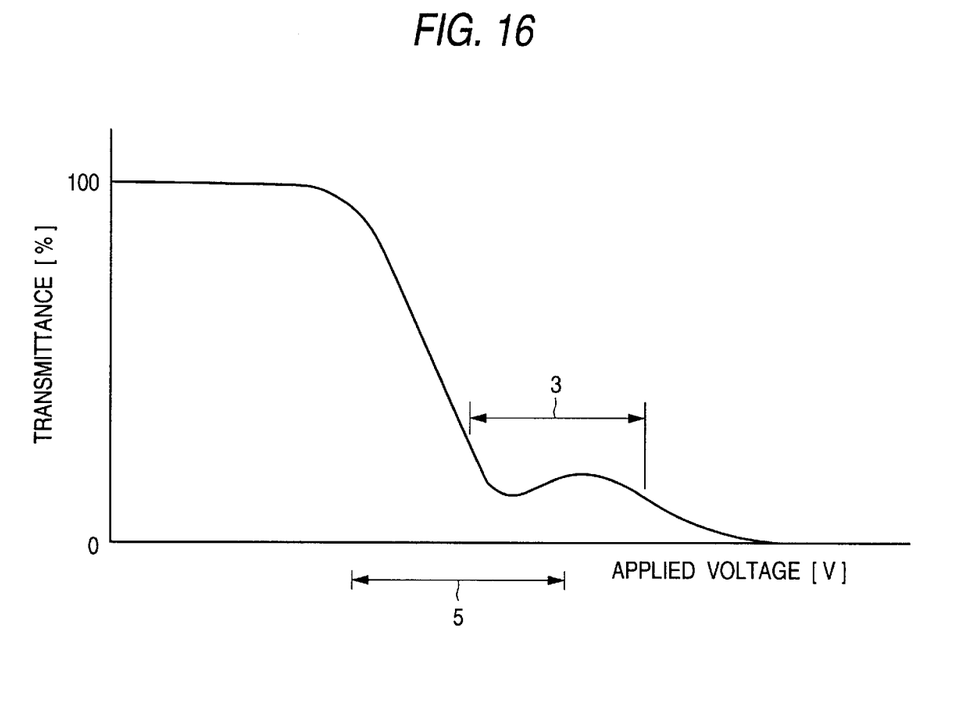
FIG. 16 is a graph to show the relationship between applied voltage to liquid crystal of each pixel part of the liquid crystal display and transmittance of light of backlight passing through the pixel part when the liquid crystal display is viewed from the visible direction A in FIG. 14.

FIG. 16 is a graph to show the relationship between applied voltage to liquid crystal of each pixel part and transmittance of light of backlight passing through the pixel part when the liquid crystal display 1 is viewed from the direction A. Here, the applied voltage to liquid crystal of each pixel part is changed with the signal voltage of a video signal input for each pixel.

FIG. 16 is applied to normally white liquid crystal display 1; basically, as the applied voltage increases, the light transmittance lowers and screen display darkens. When the liquid crystal display 1 is viewed from the direction A, the light transmittance bounds in the latter half portion of the change range in which the light transmittance lowers gradually with an increase in the applied voltage, and the area in which the applied voltage to liquid crystal can be changed contains an image inversion area 3 in which image inversion occurs depending on the visible direction.

In FIG. 16, numeral 5 denotes a standard change range of applied voltage to liquid crystal changed with the signal level of a video signal. In the standard change range 5, a gradation area less than a halftone area in the change range 5 overlaps the image inversion area 3 and image inversion occurs in the overlap area.

The change range 5 is set from the two viewpoints of suppression of the effect of image inversion and providing sufficient contrast; the gradation area less than the halftone area in the change range 5 largely overlaps the image inversion area 3. Thus, to display a screen with gradation level (brightness level indicated by the signal level of a video signal) set low as a whole (comparatively dark display screen), the effect of image inversion is largely received.

By the way, a car display unit provided for a car navigation system, etc., changes different screens such as road map screens and various operation screens (menu screens) for setting a destination, etc., based on an input signal input through a predetermined input part such as a touch switch. The screens may differ from each other in brightness level fitted to display because of the difference in the display form, etc., of displayed visible information, and the effect of image inversion described above also varies from one screen to another.

In contrast, the conventional car display unit displays such different screens by changing applied voltage to liquid crystal in the liquid crystal display in the single standard change range 5; the different screens are displayed at the same brightness level.

To decrease the effect of image inversion, etc., the change range of applied voltage to liquid crystal may be adjusted for correcting the brightness level depending on the screen type, as described above. However, the conventional car display unit basically displays the different screens at the same brightness level, thus the effect of image inversion is largely received depending on the screen, and visibility is degraded.

Some of such car display units are provided with a brightness control, etc., for changing the change range of applied voltage to liquid crystal for adjusting the screen brightness level, but it is difficult for the user to operate the brightness control, etc., each time in association with screen change made comparatively frequently.

SUMMARY OF THE INVENTION

It is therefore an object of the invention to provide an car display unit capable of automatically adjusting a screen brightness level to a proper level responsive to the type of displayed screen as the screen type is changed and improving screen visibility.

To the end, according to a first aspect of the invention, there is provided a car display unit for changing display of different screens such as a road map screen for car navigation and various menu screens based on an input signal fed through an input section for accepting predetermined operation input, the car display unit comprising a screen change section for changing a displayed screen among the screens based on the input signal fed through the input section, a display signal generation section, when the screen change section changes one screen to a different screen, being responsive to the screen change for generating and outputting a video signal for displaying the different screen, a liquid crystal display section having a plurality of pixels and being responsive to the signal level of the video signal input for each pixel for changing voltage applied to liquid crystal of each pixel part in a predetermined change range and changing transmittance of light for display, thereby displaying the screen corresponding to the video signal, a storage section for storing information for specifying a plurality of the change ranges of the applied voltage preset in a one-to-one correspondence with the screens so that each screen is displayed by the liquid crystal display section at the brightness level corresponding to the screen, and a brightness level control section, when the screen change section changes one screen to a different screen, being responsive to the screen change for selecting the change range of the applied voltage corresponding to the different screen from among the change ranges based on the information stored in the storage section and instructing the liquid crystal display section to change the applied voltage in the selected change range.

To the end, according to a second aspect of the invention, there is provided a car display unit for changing display of different screens such as a road map screen for car navigation and various menu screens based on an input signal fed through an input section for accepting predetermined operation input, the car display unit comprising a screen change section for changing a displayed screen among the screens based on the input signal fed through the input section, a display signal generation section, when the screen change section changes one screen to a different screen, being responsive to the screen change for generating and outputting a video signal for displaying the different screen, a liquid crystal display section having a plurality of pixels and being responsive to the signal level of the video signal input for each pixel for changing voltage applied to liquid crystal of each pixel part in a predetermined change range and changing transmittance of light for display, thereby displaying the screen corresponding to the video signal, an average level calculation section, when the screen change section changes one screen to a different screen, being responsive to the screen change for calculating an average level by averaging the signal level of the video signal input for each pixel of the liquid crystal display section, generated the display signal generation section about the pixels of the whole screen displayed by the video signals or the pixels in a part area of the screen, a storage section for storing information for specifying a plurality of the change ranges of the applied voltage preset in a one-to-one correspondence with partial areas into which an area in which the average level calculated by the average level calculation section can change is divided, and a brightness level control section, when the screen change section changes one screen to a different screen, being responsive to the screen change for specifying the change range of the applied voltage corresponding to the partial area to which the average level indicated by the calculation result of the average level calculation section belongs based on the information stored in the storage section and instructing the liquid crystal display section to change the applied voltage in the specified change range.

Preferably, the menu screens may include a menu screen for car navigation other than the road map screen and a menu screen for controlling the accessories installed in a vehicle.

DETAILED DESCRIPTION OF THE PREFERRED EMBODIMENTS

Figure 1:
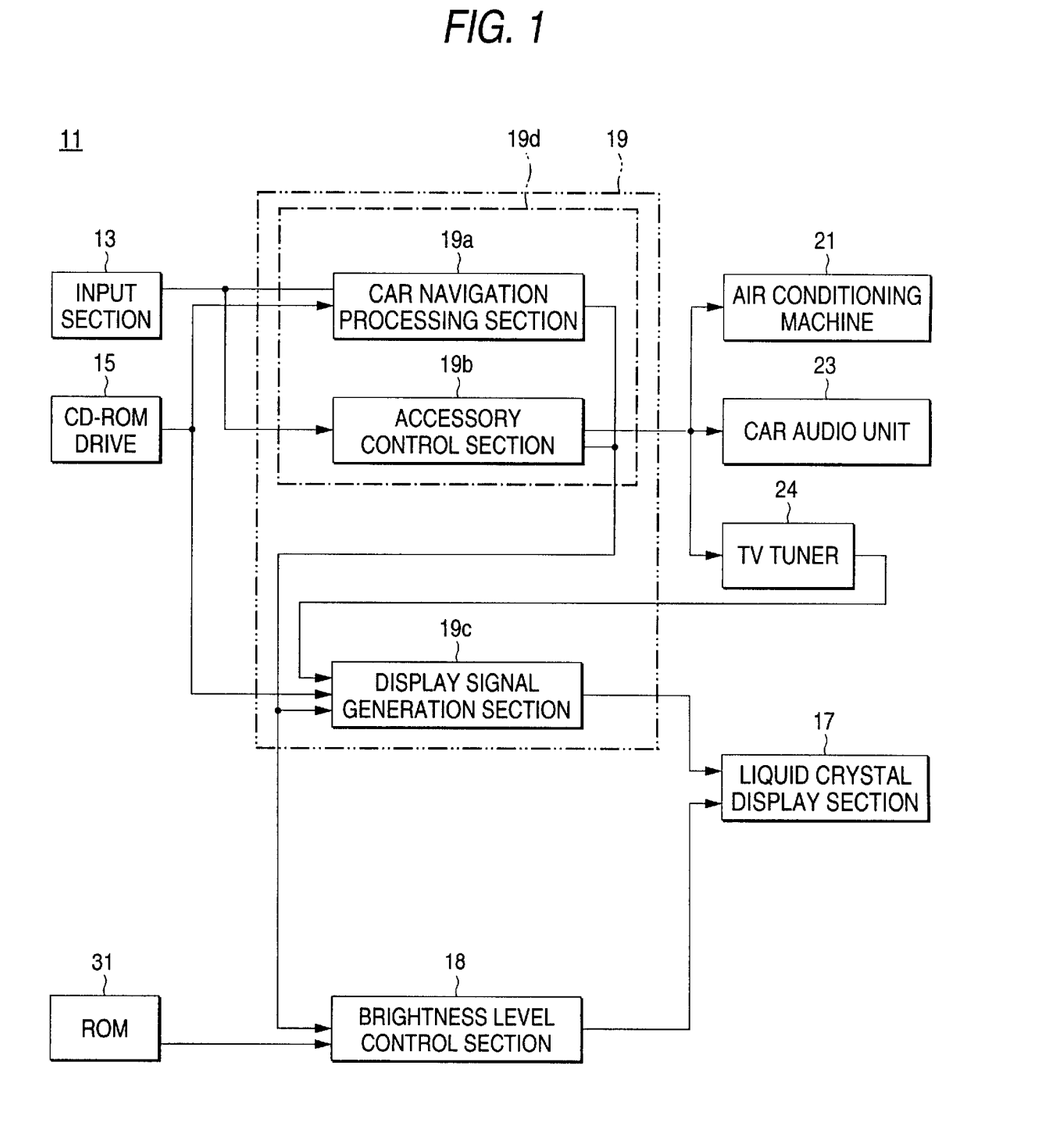
FIG. 1 is a block diagram of a car navigation system incorporating a car display unit according to a first embodiment of the invention.

FIG. 1 is a block diagram of a car navigation system incorporating a car display unit according to a first embodiment of the invention. The car navigation system 11 comprises an input section 13 provided with touch switches, and operation switches for executing operation input required for car navigation, a CD-ROM drive 15 for reading road information or the like from a CD-ROM, a liquid crystal display section 17, a brightness level control section 18 for controlling the brightness level of a screen displayed by the liquid crystal display section 17, and a system main body 19 for serving a car navigation function, a control function of various accessories installed in a vehicle, and the like.

The liquid crystal display section 17 is a TFT LCD provided with pixels corresponding to color components of R, G, B signals contained in input video signal. It changes voltage applied to liquid crystal of each pixel part in response to the signal level of R, G, B signal input for each pixel together with a horizontal synchronizing signal and a vertical synchronizing signal for changing transmittance of light of backlight passing through the pixel part, thereby displaying an image (screen) corresponding to the input R, G, B signals. The liquid crystal display section 17 also has a function of changing the change range of the applied voltage to liquid crystal of each pixel part based on an instruction input from the brightness level control section 18.

The system main body 19 comprises a car navigation processing section 19a for serving the car navigation function, an accessory control section 19b for controlling accessories (here, an air conditioning machine 21, a car audio unit 23, and a TV tuner 24), and a display signal generation section 19c for generating video signals required for causing the liquid crystal display section 17 to display road screens for car navigation and various operation screens used to operate the accessories through the car navigation system 11.

The car navigation processing section 19a performs processing operation required for car navigation based on operation input entered through the input section. The processing operation includes reception of position information required for finding the home car position, transmitted from an artificial satellite, reception of traffic information transmitted by FM multiplex broadcasting, etc., reading of map information from a recording medium such as a CD-ROM, road guide processing of performing predetermined information processing for showing the user the way based on the position information, the traffic information, and the map information, controlling the display contents of the liquid crystal display section 17 through the display signal generation section 19c, and causing the liquid crystal display section 17 to display navigation information of road map screens, the home car position, an optimum path, etc., and the like.

The accessory control section 19b causes the liquid crystal display section 17 to display operation screens for displaying visible information required for operating the accessories of the air conditioning machine 21, the car audio unit 23, the TV tuner 24, etc., through the display signal generation section 19c and controlling the accessories based on signals input from the input section 13.

The car navigation processing section 19a and the accessory control section 19b, which correspond to a screen change section 19d according to the invention, change display of different screens of road map screens, operation screens, etc., based on signals input from the input section 13 in cooperation with each other.

Figure 2:
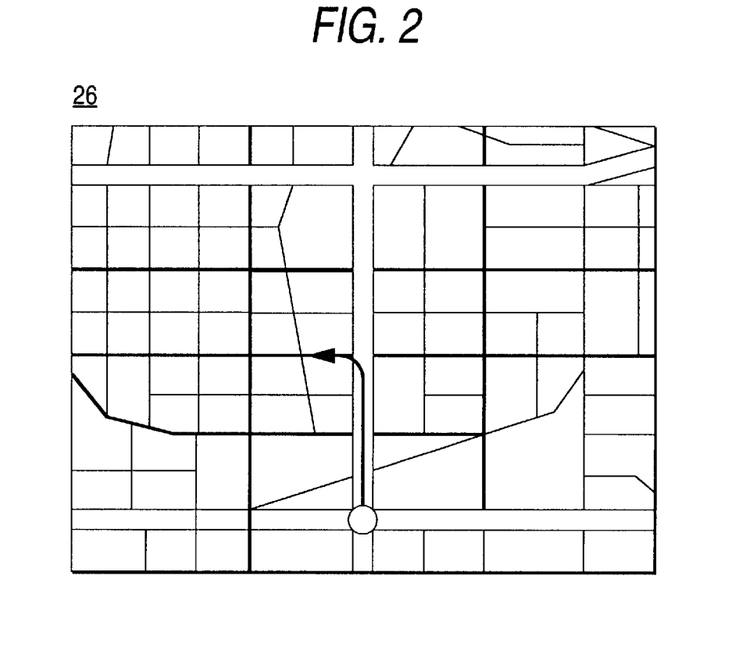
FIG. 2 is an illustration to show a road map screen for car navigation displayed by the system in FIG. 1.
Figure 3:
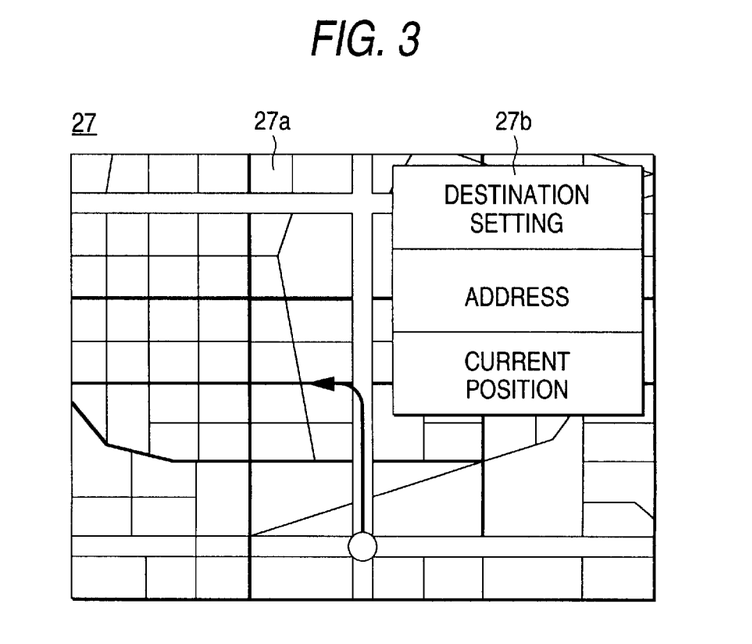
FIG. 3 is an illustration to show an operation screen displayed by the system in FIG. 1 when a destination is set.
Figure 4:
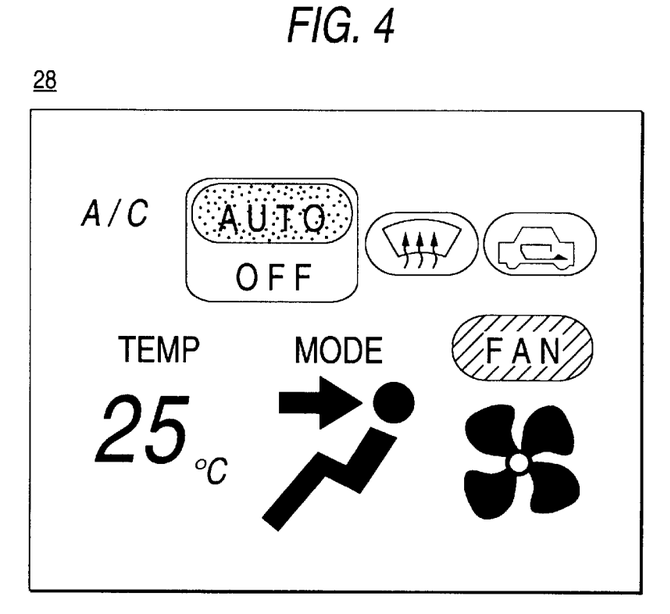
FIG. 4 is an illustration to show an accessory operation screen displayed by the system in FIG. 1 when an air conditioning machine is operated.
Figure 5:
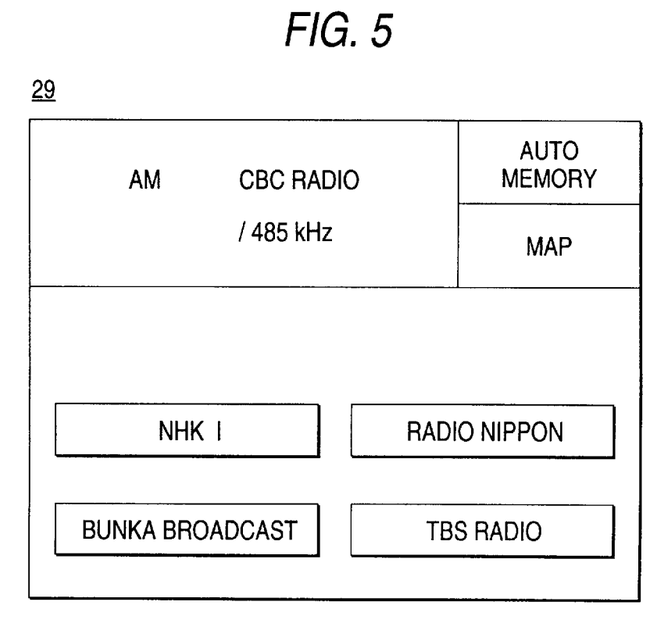
FIG. 5 is an illustration to show a radio operation screen displayed by the system in FIG. 1 when a radio is operated.
Figure 6:
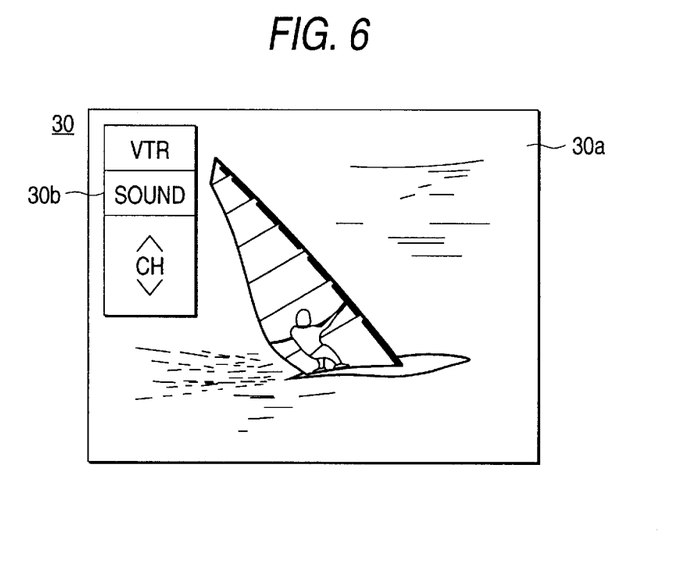
FIG. 6 is an illustration to show a television screen displayed by the system in FIG. 1.

The screens displayed in the car navigation system include those shown in FIG. 2 to FIG. 6 and FIG. 8, for example. FIG. 2 shows a road map screen 26 for car navigation. FIG. 3 shows an operation screen 27 with a predetermined operation window 27b superposed on a road map image 27a displayed when a destination is set. FIG. 4 shows an accessory operation screen 28 displayed when the air conditioning machine 21 is operated. FIG. 5 shows a radio operation screen 29 displayed when a radio contained in the car audio unit 23 is operated. FIG. 6 shows a television screen 30 with a predetermined operation window 30b (displayed as required) superposed on a television image 30a selected through the TV tuner 24. The screens 26 to 30 are changed by the image change section 19d.

The display signal generation section 19c generates a video signal for causing the liquid crystal display section 17 to display a screen such as any of the screens 26 to 30 specified by the screen change section 19d based on image information read from a CD-ROM, etc., image information stored in memory such as ROM (not shown) installed in the system main body 19, a video signal of a television image received by the TV tuner 24, or the like, and outputs the generated video signal to the liquid crystal display section 17.

Figure 7:
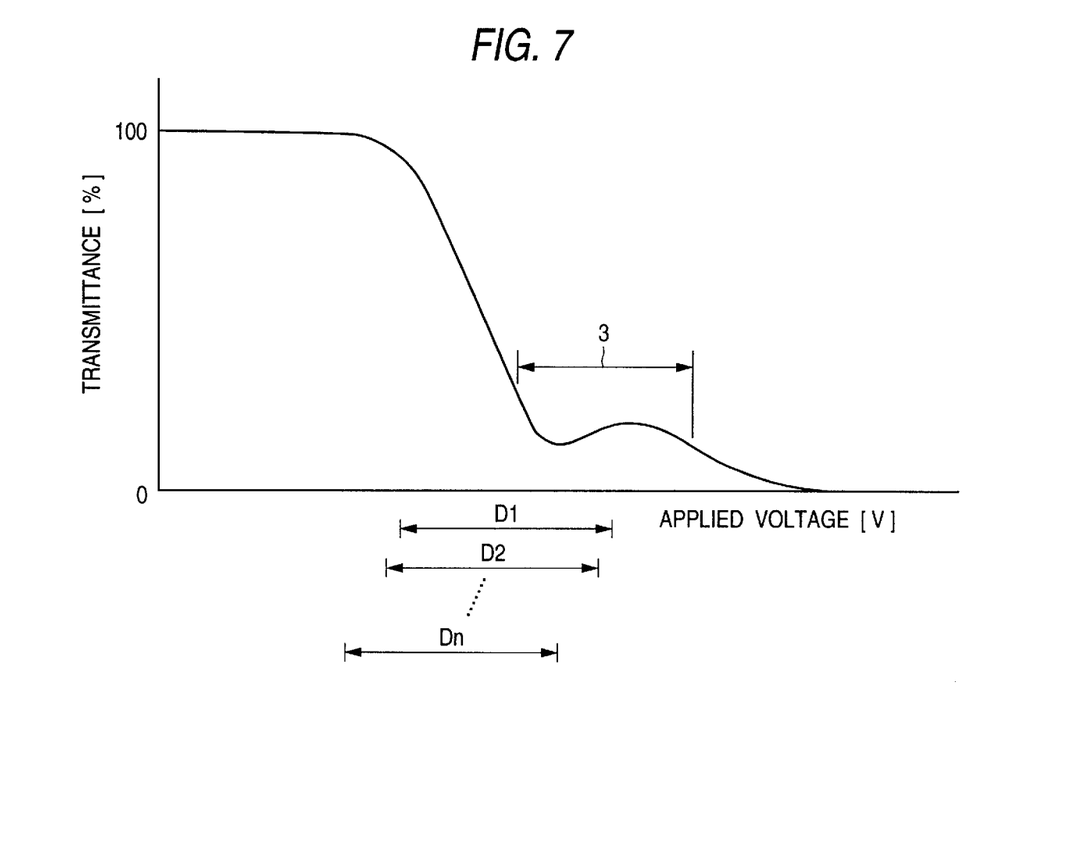
FIG. 7 is an illustration to show change ranges D1 to Dn of applied voltage to liquid crystal of a liquid crystal display section, set in the system in FIG. 1.

In the embodiment, as shown in FIG. 7, a plurality of change ranges D1 to Dn placed at voltage positions in offset relation by predetermined potential in the high or low voltage direction are set as the applied voltage ranges to liquid crystal in the liquid crystal display section 17. The change ranges D1 to Dn are previously related to the different screens to be displayed such as the screens 26 to 30 so that each screen is displayed at an appropriate brightness level responsive to the gradation level indicated by the video signal and the display contents from the viewpoints of decreasing the effect of image inversion and providing sufficient contrast. The graph in FIG. 7, which is similar to the graph in FIG. 16, shows change in light transmittance of each pixel part with change in applied voltage when the liquid crystal display section 17 is viewed from the visible direction A in FIG. 14.

Information to specify the change ranges D1 to Dn is stored in ROM (storage section) 31 made of EPROM, etc., placed in the brightness level control section 18 together with information concerning the correspondence between the change ranges D1 to Dn and the screens. The brightness level control section 18 reads the information as required and specifies the change ranges D1 to Dn. The information to specify the change ranges D1 to Dn may be recorded on a CD-ROM and the brightness level control section 18 may read the information through the CD-ROM drive 15 and the screen change section 19d.

When a screen is changed to a different screen by the screen change section 19d, the brightness level control section 18 selects the applied voltage change range D1–Dn corresponding to the different screen from among the change ranges D1 to Dn based on the information concerning the correspondence between the change ranges D1 to Dn and the screens and the information to specify the change ranges D1 to Dn stored in the ROM 31, and instructs the liquid crystal display section 17 to change the applied voltage in the selected change range D1–Dn.

Here, an example of brightness adjustment made by the brightness level control section 18 is given. For example, if the gradation level of an operation screen such as the operation screen 28 in FIG. 4 is set high (so that the screen is displayed almost white) as a whole as compared with the road map screen 26 in FIG. 2 and the screen becomes too bright when it is displayed at the same brightness level as the road map screen 26, as the road map screen 26 is changed to the operation screen, the change range D1-Dn of applied voltage to liquid crystal is changed to a change range with higher voltage position than the change range used when the road map screen 26 is displayed for lowering the screen brightness level to a proper level.

The car navigation system 11 enables the user to set the brightness level of the first displayed screen at the power on time (initial screen) as he or she desires. If the user does not initialize the brightness level of the initial screen, a guide screen 51 shown in FIG. 8 for requesting the user to specify whether or not he or she initializes the brightness level is displayed at the power on time.

Figure 8:
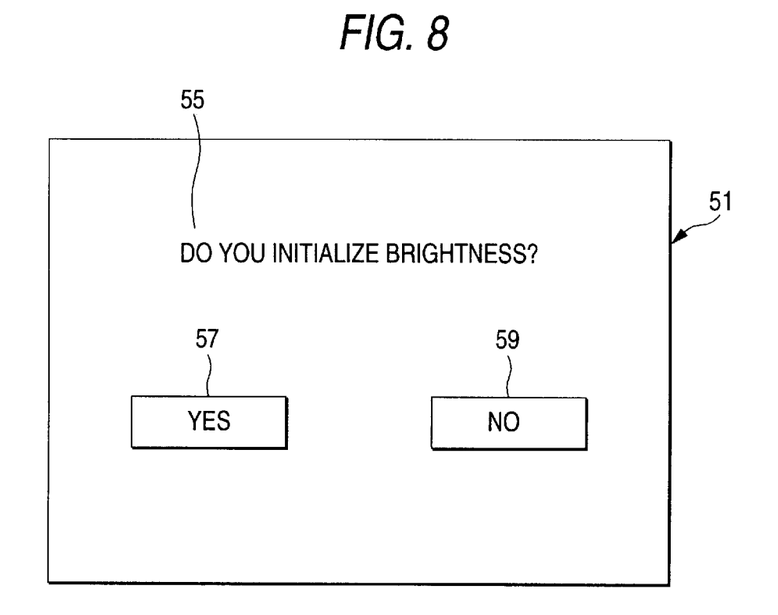
FIG. 8 is an illustration to show a guide screen displayed by the system in FIG. 1.

The display of the guide screen 51 contains a message 55 of "DO YOU INITIALIZE BRIGHTNESS" for requesting the user to specify whether or not he or she initializes the brightness level and operation input areas 57 and 59 with YES and NO respectively for the user to enter the specification result through the touch switch of the input section 13. The touch switch uses an infrared sense switch, for example, for detecting touch of a user's finger, etc., in an operation input area such as the operation input area 57 or 59 provided on the display surface of the liquid crystal display section 17.

Figure 9:
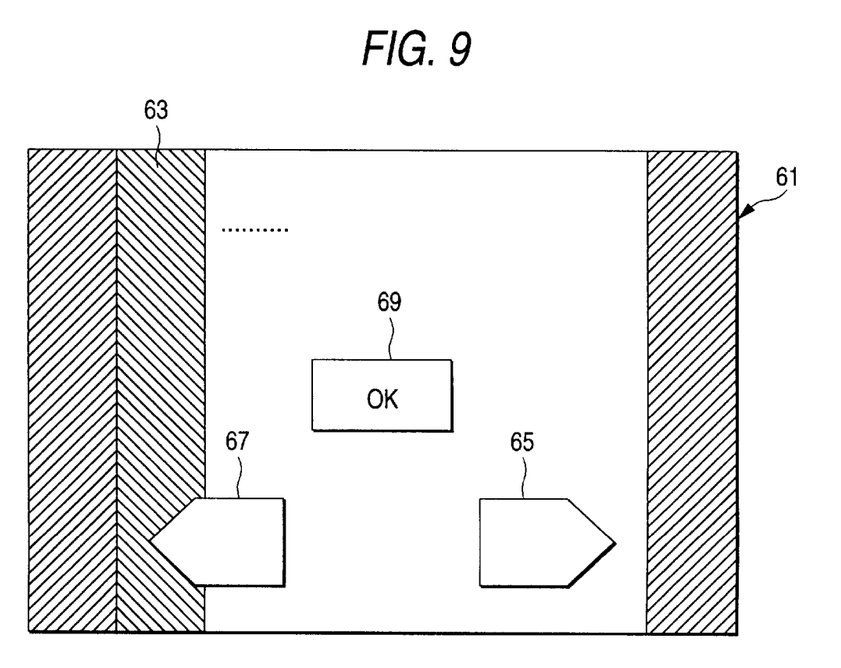
FIG. 9 is an illustration to show a brightness level setting screen displayed by the system shown in FIG. 1.

If the user presses the operation input area 57 "YES" with the guide screen 51 displayed, then a brightness level setting screen 61 shown in FIG. 9 is displayed for the user to initialize the brightness level. The brightness level setting screen 61 displays a color bar pattern 63 at a predetermined brightness level and also displays an operation input area 65 for raising the brightness level, an operation input area 67 for lowering the brightness level, and an operation input area 69 for determining the setup brightness level so as to superpose the operation input areas 65, 67, and 69 on the color bar pattern 63.

An input signal through the touch panel is also input to the brightness level control section 18 through the screen change section 19d. As the user presses the operation input area 65, the brightness level control section 18 instructs the liquid crystal display section 17 to shift the change range of applied voltage to liquid crystal by predetermined voltage level in the low voltage direction, whereby the brightness level of the brightness level setting screen 61 is raised by predetermined level. In contrast, as the user presses the operation input area 67, the brightness level control section 18 instructs the liquid crystal display section 17 to shift the change range of applied voltage to liquid crystal by predetermined voltage level in the high voltage direction, whereby the brightness level of the brightness level setting screen 61 is lowered by predetermined level.

If a desired brightness level is thus set, the user presses the operation input area 69, whereby the setup brightness level is determined and registered and the screen returns to the normal screen display. Information for specifying the change range of applied voltage to liquid crystal corresponding to the determined brightness level is recorded in the ROM 31 by the brightness level control section 18. Information for specifying the change range of applied voltage to liquid crystal corresponding to a preset brightness level at the shipment time is also recorded in the ROM 31. If the user does not initialize the brightness level, the initial screen is displayed at the brightness level set at the shipment time (default brightness level).

Figure 10:
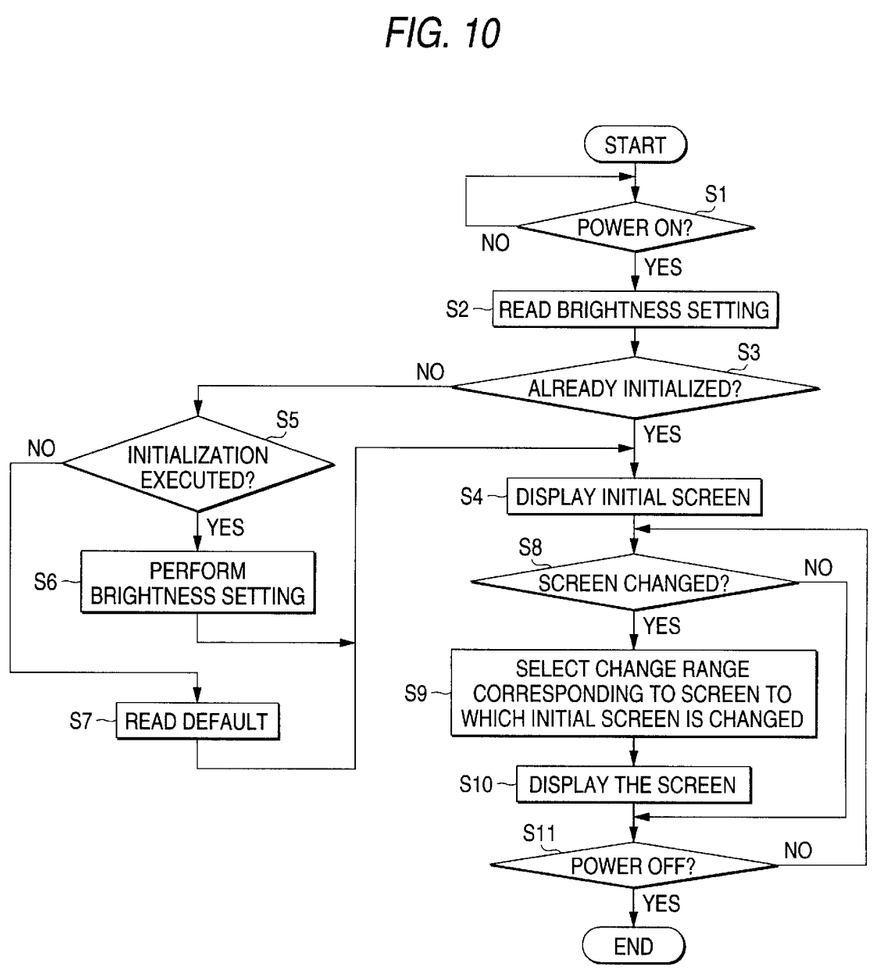
FIG. 10 is a flowchart of screen brightness adjustment in the control operation of the system in FIG. 1.

FIG. 10 is a flowchart of screen brightness adjustment in the control operation of the car navigation system 11. In the figure, when a power switch of the car navigation system 11 is turned on at step S1, control goes to step S2 and the brightness level control section 18 reads the information for specifying the change range corresponding to the brightness level of the initial screen, initialized by the user and recorded in the ROM 31, then goes to step S3.

At step S3, the brightness level control section 18 determines whether or not the brightness level of the initial screen is initialized by the user. If the brightness level of the initial screen is initialized, the brightness level control section 18 instructs the liquid crystal display section 17 to change the applied voltage to liquid crystal in the change range corresponding to the initialized brightness level, then control goes to step S4. If the brightness level of the initial screen is not initialized, control goes to step S5.

At step S5, the liquid crystal display section 17 displays the guide screen 51 shown in FIG. 8 based on the video signal generated by the display signal generation section 19c and the system waits for the user to determine whether or not he or she is to initialize the brightness level. If the user presses the operation input area 57, control goes to step S6 for initializing the brightness level. On the other hand, if the user presses the operation input area 59, control goes to step S7 and the brightness level control section 18 reads the information for specifying the change range of applied voltage to liquid crystal corresponding to the default brightness level from the ROM 31 and instructs the liquid crystal display section 17 to change the applied voltage to liquid crystal in the read change range, then control goes to step S4.

At step S6, the brightness level is adjusted based on the input from the operation input area 65, 67 as described above and subsequently if the user presses the operation input area 69, the brightness level control section 18 registers the change range of applied voltage to liquid crystal at the point in time in the ROM 31 and instructs the liquid crystal display section 17 to change the applied voltage to liquid crystal in the change range, then control goes to step S4.

At step S4, the predetermined initial screen is displayed at the brightness level set by the user or at the default brightness level, then control goes to step S8.

If the screen change section 19d changes the screen to a different screen at step S8, control goes to step S9 at which the brightness level control section 18 selects the change range D1–Dn corresponding to the different screen from among the change ranges D1 to Dn based on the information recorded in the ROM 31 and instructs the liquid crystal display section 17 to change the applied voltage to liquid crystal in the selected change range D1–Dn, then control goes to step S10. On the other hand, if the screen change section 19d does not change the screen at step S8, control goes to step At step S10, the different screen is displayed at the brightness level corresponding thereto, then control goes to step S11. If the power is turned off at step S11, the operation is terminated; if the power is not turned off at step S11, control returns to step S8 and steps S8 to S11 are repeated until the power is turned off.

As described above, according to the embodiment, as the screen change section 19d changes one screen to another based on the input signal through the input section 13, the brightness level control section 18 automatically adjusts the screen brightness level to proper brightness responsive to the screen display contents. Each screen is thus displayed at the brightness level responsive to the screen, whereby the effect of image inversion, etc., on each screen can be decreased and the screen visibility can be improved.

Figure 11:
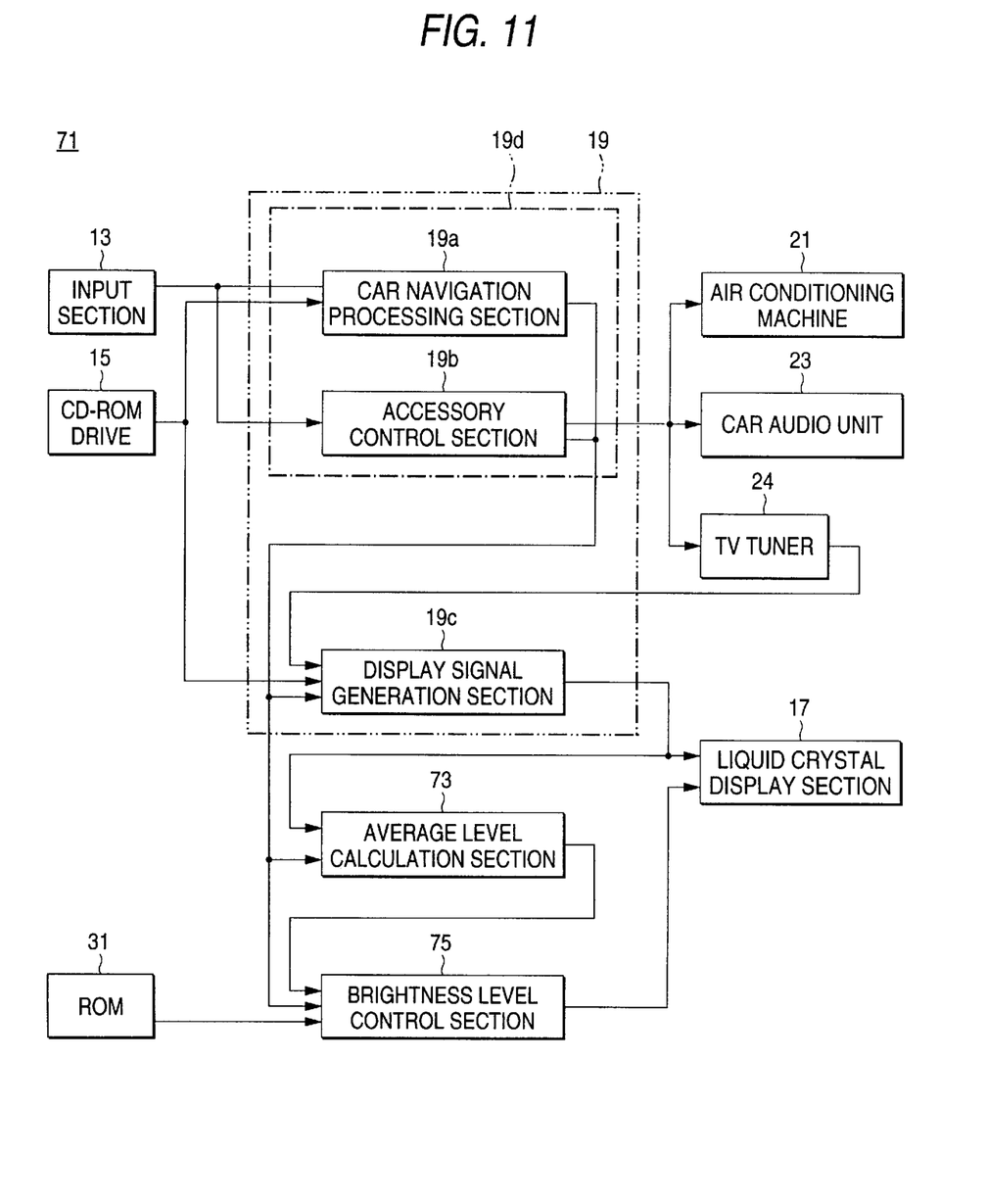
FIG. 11 is a block diagram of a car navigation system incorporating a car display unit according to a second embodiment of the invention.

FIG. 11 is a block diagram of a car navigation system incorporating a car display unit according to a second embodiment of the invention. The car navigation system 71 is the same as the car navigation system 11 described above except that it comprises an average level calculation section 73 and a brightness level control section 75 in place of the brightness level control section 18 described above. Parts identical with or similar to those previously described with reference to FIG. 1 are denoted by the same reference numerals in FIG. 11 and will not be discussed again.

As a screen change section 19d changes a screen 26, 30, etc., to another screen 26, 30, etc., the average level calculation section 73 calculates an average level by averaging the signal levels of video signals (R, G, B signals) corresponding to the screen (here, the first displayed screen after the screen change), generated by a display signal generation section 19c spatially about the pixels of the whole screen displayed by the video signals or the pixels belonging to a part area of the screen.

For a setting method of a screen area where an average level is calculated, if display requiring higher visibility as compared with other areas is produced as in operation window 27b in a specific area of operation screen 27 in FIG. 3, etc., an average level is calculated about the display area of the operation window 27b. Only if visibility of the same degree is required for the whole screen like road map screen 26 in FIG. 2, an average level is calculated about the whole screen. Information for specifying the screen area where the average level calculation is to be executed is fed by the display signal generation section 19c into the average level calculation section 73.

Figure 12:
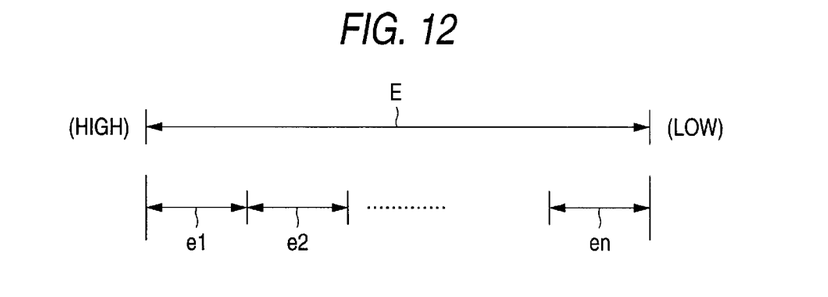
FIG. 12 is an illustration to show area E in which the average level calculated by an average level calculation section contained in the system in FIG. 11 can change.

FIG. 12 shows area E in which the average level calculated by the average level calculation section 73 can change. As shown here, the area E is divided into partial areas e1 to en. The average level denotes an average value of gradation levels of the screen area where the average level is calculated. For example, the higher the average level, the darker is the image displayed in the area.

Figure 13:
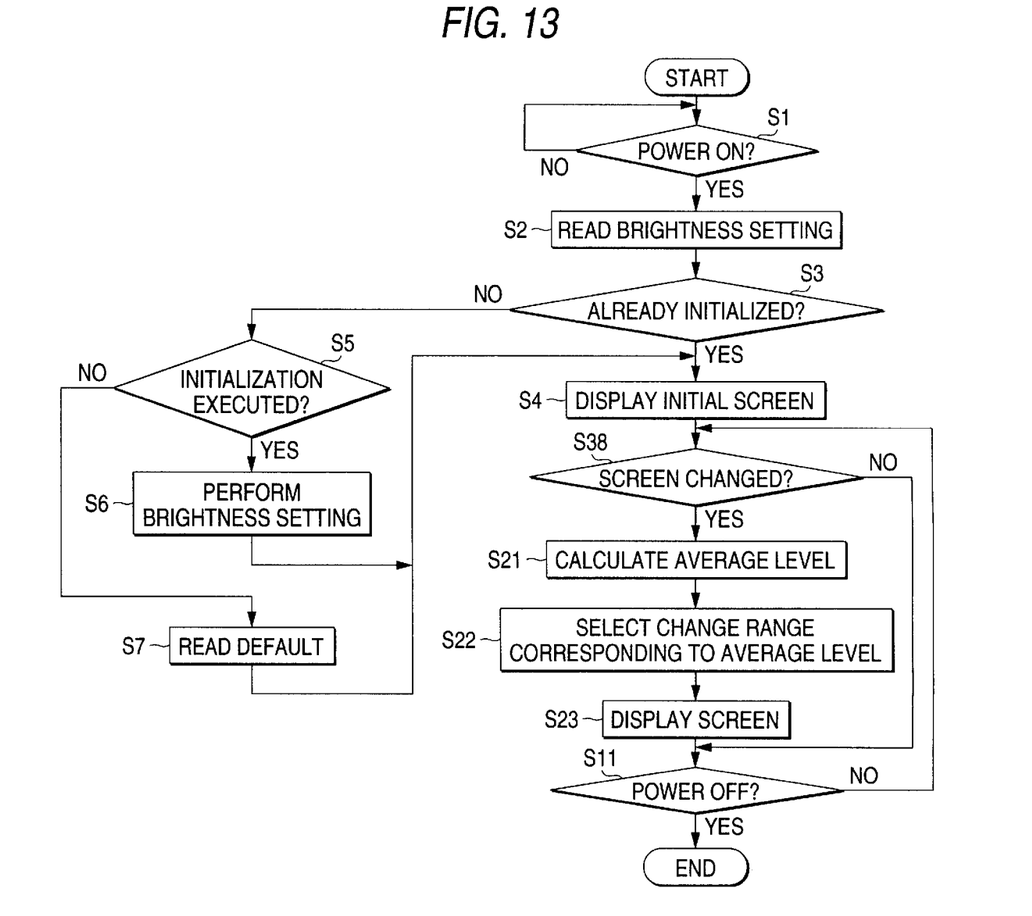
FIG. 13 is a flowchart of screen brightness adjustment in the control operation of the system in FIG. 11.

In the embodiment, change ranges D1 to Dn are set in a one-to-one correspondence with the partial areas e1 to en of the area E in FIG. 13 as the change range in which a liquid crystal display section 17 changes the applied voltage to liquid crystal in response to the signal level of video signal as in the first embodiment (see FIG. 7). The change ranges D1 to Dn are set to voltage positions optimum for the corresponding partial areas e1 to en so as to decrease the effect of image inversion and provide sufficient contrast on each screen. As the correspondence between the change ranges D1 to Dn and the partial areas e1 to en, for example, the change range D1 corresponds to the partial area e1, the change range D2 corresponds to the partial area e2, . . . , the change range Dn corresponds to the partial area en.

Information for specifying the partial areas e1 to en of the area E and the change ranges D1 to Dn and information for specifying the correspondence between the partial areas e1 to en and the change ranges D1 to Dn are recorded in ROM 31 and are read by the brightness level control section 75 as required. The information may be recorded on a CD-ROM and the brightness level control section 75 may read the information through a CD-ROM drive 15 and the screen change section 19d.

As the screen change section 19d changes a screen, the brightness level control section 75 selects the change range D1–Dn corresponding to the partial area e1–en to which the average level calculated by the average level calculation section 73 belongs from among the change ranges D1 to Dn based on the information stored in the ROM 31 and instructs the liquid crystal display section 17 to change the applied voltage to liquid crystal in the selected change range D1-Dn.

Like the car navigation system 11, the car navigation system 71 enables the user to set the brightness level of an initial screen first displayed at the power on time as he or she desires. Like the brightness level control section 18, the brightness level control section 75 can adjust the brightness level based on a brightness level setting screen 61 and registers the change range of the applied voltage to liquid crystal corresponding to the determined brightness level in the ROM 31.

FIG. 13 is a flowchart of screen brightness adjustment in the control operation of the car navigation system 71. Steps identical with or similar to those previously described with reference to FIG. 10 are denoted by the same reference numerals in FIG. 13 and will not be discussed again.

After the power is turned on at step S1, control goes via steps S2 to S7 to step S8 and if the screen change section 19d changes the screen to a different screen, control goes to step S21. On the other hand, if the screen change section 19d does not change the screen, control goes to step S11.

At step S21, the average level calculation section 73 calculates an average level of video signals about the whole of the different screen or a part area of the screen, then control goes to step S22 at which the brightness level control section 75 determines which of the partial areas e1 to en of the area E shown in FIG. 12 the average level calculated by the average level calculation section 73 belongs to, selects the change range D1–Dn corresponding to the partial area e1–en to which the average level belongs from among the change ranges D1 to Dn, and instructs the liquid crystal display section 17 to change the applied voltage to liquid crystal in the selected change range D1–Dn.

At step S23 following step S22, the different screen is displayed at the brightness level corresponding to the screen, then control goes to step S11. If the power is turned off at step S11, the operation is terminated; if the power is not turned off at step S11, control returns to step S8 and steps S8, S21 to S23, and S11 are repeated until the power is turned off.

As described above, according to the embodiment, as the screen change section 19d changes one screen to a different screen based on the input signal through an input section 13, the average level calculation section 73 calculates an average level of video signals about the whole of the different screen or a part area of the screen and the brightness level control section 75 automatically adjusts the screen brightness to the brightness level responsive to the calculated average level. Each screen is thus displayed at the brightness level responsive to the screen, whereby the effect of image inversion, etc., on each screen can be decreased and screen visibility can be improved.

In the average level calculation processing of the average level calculation section 73, if display requiring higher visibility as compared with other areas is produced as in an operation window in a specific area of a screen, an average level is calculated about the display area of the operation window. Only if visibility of the same degree is required for the whole screen like the road map screen 26, an average level is calculated about the whole screen. Thus, the screen brightness level can be adjusted to a display area to be highlighted like the operation window, the visibility of the important display contents of the operation window, etc., can be furthermore improved, and the operation processing load can be decreased as compared with the load on average level calculation processing performed for the whole screen in all types of screens.

As described above, according to the invention, as the screen change section changes one screen to a different screen based on the input signal fed through the input section, the brightness level control section automatically adjusts the screen brightness level to proper brightness responsive to the different screen. Each screen is thus displayed at the brightness level responsive to the screen, whereby the effect of image inversion, etc., on each screen can be decreased and the screen visibility can be improved.

What is claimed is:

1. A car display unit for changing display of different screens based on an input signal fed through an input section for accepting predetermined operation input, said car display unit comprising:

a screen change section for changing a displayed screen among the screens based on the input signal fed through the input section;

a display signal generation section, when said screen change section changes one screen to a different screen, being responsive to the screen change for generating and outputting a video signal for displaying the different screen;

a liquid crystal display section having a plurality of pixels and being responsive to a signal level of the video signal input for each pixel for changing voltage applied to liquid crystal of each pixel part in a predetermined change range and changing transmittance of light for display, thereby displaying the screen corresponding to the video signal;

a storage section for storing information for specifying a plurality of the change ranges of the applied voltage preset in a one-to-one correspondence with the screens so that each screen is displayed by said liquid crystal display section at a brightness level corresponding to the screen; and a brightness level control section, when said screen change section changes one screen to a different screen, being responsive to the screen change for selecting the change range of the applied voltage corresponding to the different screen from among the change ranges based on the information stored in said storage section and instructing said liquid crystal display section to change the applied voltage in the selected change range.

2. The car display unit as claimed in claim 1 wherein the menu screens include a menu screen for car navigation other than the road map screen and a menu screen for controlling accessories installed in a vehicle.

3. A car display unit for changing display of different screens based on an input signal fed through an input section for accepting predetermined operation input, said car display unit comprising:

a screen change section for changing a displayed screen among the screens based on the input signal fed through the input section;

a display signal generation section, when said screen change section changes one screen to a different screen, being responsive to the screen change for generating and outputting a video signal for displaying the different screen;

a liquid crystal display section having a plurality of pixels and being responsive to a signal level of the video signal input for each pixel for changing voltage applied to liquid crystal of each pixel part in a predetermined change range and changing transmittance of light for display, thereby displaying the screen corresponding to the video signal;

an average level calculation section, when said screen change section changes one screen to a different screen, being responsive to the screen change for calculating an average level by averaging the signal level of the video signal input for each pixel of said liquid crystal display section, generated said display signal generation section about the pixels of the whole screen displayed by the video signals or the pixels in a part area of the screen;

a storage section for storing information for specifying a plurality of the change ranges of the applied voltage preset in a one-to-one correspondence with partial areas into which an area in which the average level calculated by said average level calculation section can change is divided; and a brightness level control section, when said screen change section changes one screen to a different screen, being responsive to the screen change for specifying the change range of the applied voltage corresponding to the partial area to which the average level indicated by the calculation result of said average level calculation section belongs based on the information stored in said storage section and instructing said liquid crystal display section to change the applied voltage in the specified change range.

4. The car display unit as claimed in claim 3 wherein the menu screens include a menu screen for car navigation other than the road map screen and a menu screen for controlling accessories installed in a vehicle.

* * * * *